United States Patent Office 3,070,557
Patented Dec. 25, 1962

3,070,557
THERMOPLASTIC POLYMER-BONDED AGGREGATE COMPOSITIONS, AND MANUFACTURE THEREOF
Albert M. Gessler, Cranford, and William J. Sparks, Westfield, N.J., assignors to Esso Research and Engineering Company, a corporation of Delaware
No Drawing. Filed Aug. 3, 1959, Ser. No. 831,042
16 Claims. (Cl. 260—4)

This invention relates to novel compositions comprising aggregates and/or fillers bonded with polymers, and to methods of preparing such compositions.

The invention comprises a thermoplastic composition of polymer-bonded aggregate having suitable thermoplastic processability and, when formed and cooled, having desirably high strength and flexibility characteristics over a wide temperature range from very hot to very cold. Such a composition may comprise, for instance, a fine sand having a coating of about 2 to 8% by wt. of a linear polymer such as a polyethylene of 1,000 to 10,000 mol. wt.

Various types of polymers may be used for carrying out the invention, but generally any moderately high mol. wt. thermoplastic linear type or long-chain polymer having a softening point between about 110° F. and about 230° F., preferably between 120° F. and 215° F., and substantially free of cross-linking, can be used. These polymers also should have a melt viscosity (c.p.s.) of about 100–30,000, preferably about 150–20,000, at practical hot mixing and forming temperatures of about 200–500° F., preferably 250°–400° F. These polymers also desirably should have a cold/hot viscosity ratio (300° F./500° F.) below 40, preferably about 3–20, and usually should be about 4–15.

Suitable polymers include solid polyethylenes of relatively low mol. wt., e.g. about 1,000 to 10,000, of either only moderately crystalline low-density type, or of the more recently developed high-crystallinity high-density type; also solid propylenes of slightly higher mol. wt. ranges, e.g. about 2,000 to 50,000, preferably about 3,000 to 20,000; also, other polyolefins, e.g. polybutenes, polyisobutylenes, or various types of copolymers, e.g. ethylene-propylene, styrene-isobutylene, styrene-ethylene, etc. copolymers. Linear type polymers other than olefin polymers, which may be used include the low to medium mol. wt. grades of polyvinyl chloride, vinyl chloride-acetate copolymers, polyvinylidene chloride, polyacrylates, etc., as well as copolymers, and mixtures of any of these various types of polymers and copolymers, provided they have the above-stated required softening point, melt viscosity, and cold/hot viscosity ratio.

Although for many purposes it is preferred to use the above-mentioned thermoplastic linear polymers alone as the sole constituent of the binder, it may be desirable, as for special applications or circumstances, to use 1 to 40% or so, preferably about 5 to 20%, of various types of additives, such as elastomeric modifiers, e.g. butyl rubber, hevea, GR–S, neoprene, diene-nitrile rubber, etc., or lower mol. wt. plasticizers, e.g. mineral oils, fatty oils, waxes, and natural or synthetic resins, e.g. hydrogenated abietate, coumarone-indene resins, thermal or catalytic cracked petroleum resins, chlorinated paraffin wax resins, styrene-isobutylene resins, or highstyrene-lowdiene resins, etc. Such plasticizing or softening additives permit the use of linear thermoplastic polymers of much higher mol. wt., e.g. polyethylenes and polypropylenes of 50,000 or 100,000 or higher mol. wt.

The aggregates to be used according to the invention may be of numerous conventional types or certain specially adapted types, as will be discussed further herebelow. For thin sections or surface layers, e.g. about $\frac{1}{16}''$ to $\frac{1}{2}''$ or so, a fine aggregate should be used, such as a sand having a grading of about $\frac{1}{4}''$ down to 100 mesh, or a finer sand ranging from 8 mesh to 100 mesh may be used; or even finer fractions may be used, such as 20 mesh to 100 mesh, and with any of these, some dust-type fillers may be used, such as ground limestone, pulverized sand, silicas, clays, etc. For coarser sections, slabs or bulk articles, e.g. from $\frac{1}{2}''$ to 1 foot, or 5 ft. or more in thickness, with or without an over-lying finer surface coating, large crushed aggregates may be used, such as crushed stone, gravel and air-cooled slag, having either a mixed grading of $\frac{1}{2}''$ to 3'', or $\frac{1}{4}''$ to 2'' or $\frac{1}{2}''$ to 1'', etc. Alternatively, if a fairly thick section, e.g. 2 inches to 1 ft. or more is to be used without any finer surface coating, the aggregate used may be composed of both coarse and fine aggregate and may include a dust filler, such as a mixture of 100 parts by wt. of coarse stone, 80 parts by wt. of sand, and 4 to 5 parts by wt. of powdered limestone. The above aggregates may be graded either for density and lowest voids, or for a controlled desired amount of voids, e.g. 3%, 5%, 8%, etc. voids.

If desired, the fine fillers to be used, e.g. crushed silica, clays, ground limestone, or even carbon black, etc. may be subjected to severe attrition, e.g. by ball-milling with steel balls, or roll-milling one or several times through tight set steel rolls, or stamping or any other severe attrition, prior to mixing with the polymer to be coated. It has been found that such severe attrition activates the surface of the filler particles at the places where the particles have been broken or otherwise attrited, and thereby provides a tighter bond when the polymer is subsequently coated thereon, and the mixture is shaped, compacted and cooled.

Various methods may be used in carrying out the present invention, depending upon various factors such as the particular type of polymer composition used, the type of aggregates used, and according to the type of mixing equipment available. The preferred technique, referred to as hot plastic mixing, is to heat the polymer composition to be used, to a temperature about 100–300% F. above its softening point, until it has softened to a hot fluid consistency, and then mix the aggregate, preferably dried and preheated, into it, preferably gradually, until the final composition comprises about 90 to 99% by wt. of aggregate and about 1 to 10%, preferably about 2 to 8% by wt. of polymer.

Thus, for example, a low-density polyethylene having an average mol. wt. of about 5,000, which has a softening point of about 200° F. (by Ring-and-Ball Method, ASTM standards, D36–26) may be heated to a temperature of about 300 to 400° F. and then a sand having a grading of about $\frac{1}{4}''$ down to 100 mesh, preheated to a similar temperature, is gradually added with continued mixing until the mixture contains about 96% by wt. of sand and 4% of polyethylene and is substantially homogenous. This hot mixture is then ready for use in forming blocks, slabs, or other articles, or for application to a road surface where it is then compacted by rolling or tamping or any other suitable method. Alternative polymer compositions may be used, such as one comprising a mixture of about 40 to 80% by wt. of high density of polyethylene having an average mol. wt. of about 100,000, mixed with about 20 to 60% by wt. of styrene-isobutylene copolymer having a mol. wt. of about 2,000 to 5,000. Another polymer composition which can be used comprises about 10 to 50% of polypropylene having an average mol. wt. of about 50,000 to 100,000, mixed with about 50 to 90% by wt. of polyethylene having an average mol. wt. of about 1,000 to 10,000.

One advantage of using a crystalline-type polymer such as polyethylene or the crystalline polypropylenes in the binder for the aggregates, is that the resulting composition, when shaped, compacted and cooled, is substantially oil-resistant. This means, for instance, that it is resistant to softening by jet fuel spillage or by hot jet exhaust gases on airport runways, and also resistant to softening by gasoline, kerosene or lubricating oil, which may accidentally come in contact with paved surfaces around gasoline filling stations, repair garages, etc. For instance, slabs of polyethylene-bonded sand about 4' x 8' in area, and ½" or 1" thick can be precast or molded, in a factory, and then cemented in place as a complete floor covering in a commercial garage or at a service station, preferably using an ordinary asphalt or cement or various available plastic cements as a grouping to insure a good bond between the polyethylene-sand slabs and the underlying floor surface.

Similar polyethylene-sand compositions may be hot-molded in the shape of ordinary bricks or slightly larger blocks or conventional concrete blocks, and used for building walls, floors, partitions, etc., or for special paving purposes, such as a surface coating on bridges, which are subject to excessive vibration, wide temperature fluctuations, etc., where concrete, asphalt paving and wooden blocks are not as satisfactory as desirable.

For paving highways, airport runways, parking lots, bus stations, such an oil-resistant polyethylene-sand composition may be hot-rolled directly in place, either as a thin surface layer, e.g. ¼", ½" or an inch or so thick, or, together with coarse aggregate, as a 2" to 8" or thicker load-supporting base layer. Depending on the color of the fine aggregate used, or the dust filler used, if any, the polymer-bonded sand surface layer will be found to be much lighter than conventionally used asphalt surfacing, and therefore will give much better visibility for night driving, particularly when the roads are wet.

A great advantage of the present compositions is that the thermoplastic polymers used are all essentially colorless, and therefore when mixed with sand, with or without filler, they can easily be given any desired color by adding a relatively small amount of a pigment. For instance, for a white, or light grey, a few percent of white titanium dioxide pigment may be used. For other purposes, red, yellow, orange, green, blue, or even black pigments may be used, as for identifying certain areas, or for ornamental purposes, in manufactured articles, etc.

As another novel method of using the compositions of this invention, a mixture of a fine sand of about 20 mesh to 100 mesh or 200 mesh, coated with about 4 to 6% or 8% of a polyethylene of about 5,000 mol. wt., may be hot mixed and then sheeted out into thin sheets or films ranging from ¼" thick to $\frac{1}{16}$", $\frac{1}{32}$" by passing the hot mixture through one or more pairs of rolls cold enough to make the sheet maintain its shape, and additionally cooling, if necessary, with cold air, water spray, or even a water bath, to prevent sticking, and finally rolling up the resulting strip while still flexible into large rolls. These rolls may be any desired width, such as only 2" to 1' in width for marking traffic lines on highways, etc. up to 4', 6', 8', or more in width for laying down a light-colored oil-resistant and jet blast resistant surface coating on airport runways, or a surface coating to lighten up the color of an asphalt highway. Such a strip roll material may also be used in place of conventional tar paper for covering sloping roofs, or, where they are especially advantageous, for flat roofs, because such polyethylene-bonded sand is not subject to deterioration by oxidation and cracking as is the case with asphalt. For roofing purposes, one or two percent of carbon black may be added to the composition in order to stabilize against the depolymerizing effect of ultraviolet light and sunlight.

The composition of this invention may also be used for paving the beach runways, beach groins, jetties and levees, either by hot rolling method, or coating with preformed thin slabs or strip rolls.

Numerous molded or extruded articles may be formed from these polymer-bonded aggregate compositions. Conduit pipe may be extruded in various dimensions, e.g. from small sizes, such as ½" inside diameter to larger and thicker conduits of 5" or 6" inside diameter. With a lightweight vermiculite filler, instead of or in addition to fine sand or other filler, these compositions make excellent sound-deadening thermal insulation. Acid-resistant battery boxes may readily be molded from these compositions. Likewise, smaller, thinner articles such as phonograph records, as well as numerous pans, buckets, bowls, or other containers, various tools, or tool-handles, doorknobs, telephone receivers, instrument housings, electrical insulators, etc. may readily be made by selection of appropriate thermoplastic polymers and type and screen size of filler, within the purview of the present invention.

Larger or more bulky articles may also be formed, either by molding or tamping, e.g. railroad ties, large diameter pipes, e.g. 1' or 5' or more in diameter, with or without steel wire or mesh reinforcing, for conducting water, or for use in sewage systems, or gas mains, or for transporting crude oil or refined petroleum liquids. other hydraulic structures include water tanks, reservoirs, dam spillways, etc., or storage tank bottoms, etc. Precast structural columns, e.g. telephone poles, piles, etc. may be made. Such piles have the advantage that sections thereof are joinable by thermoplastic welding, i.e. by heat-softening the ends of two units which are then combined under suitable pressure and permitted to cool until solidified.

Relatively thin coatings, for instance of a polyethylene-bonded sand, may advantageously be applied by a hot rolling or hot pressing technique on the surface of concrete blocks or cinder blocks, either just on the exterior side to be exposed to the rain and weather or to wet ground as in a house foundation, or may be applied to both the interior and exterior surfaces, or if desired all of the surfaces of such blocks or construction slabs made of concrete, clay bricks, tiles, or even wood, may be coated with a relatively thin layer of these thermoplastic polymer-bonded sand compositions.

For coating either small or large diameter pipes or for protecting electric cables to be placed underground or underwater, one or more layers of polymer-bonded filler, having a polymer content of about 5 to 10%, and having a thickness ranging from a few mils to an inch or so (or even thicker) if handled in the heated condition, can be applied by the spiral strip coating method. The present compositions are low enough in cost to economically permit the use of coatings ⅛" or ¼" or so in thickness around large steel pipe, to prevent corrosion thereof, whereas the relatively thin films of plain polyethylene now sometimes used for such spiral coating of steel pipe, are so thin that they are readily subject to mechanical damage by contacting with rough, rocky surfaces or by contact with mechanical equipment or tools. On the other hand, it would be far too expensive to use sheets of plain polyethylene ⅛" or more thick.

The compositions of the present invention, at least when used in substantial thicknesses, are relatively fireproof or fire resistant, except when exposed to high temperatures over a long time. If desired to increase the fire resistance of articles made of the present compositions, various fireproofing materials may be incorporated such as highly chlorinated naphthalenes, phosphates, organic fluorides, siloxanes, silicates, etc.

An additional method of using the compositions of this invention, not practical with materials available heretofore, is to make large sheets or slabs, containers, piping, etc. by a technique analogous to that used in making corrugated paper board, but using a thermoplastic heat sealing for bonding a flat sheet of polymer-bonded aggregate composition on either one side or both sides of a corrugated sheet of similar polymer-bonded aggregate. Such corrugated sheets may be readily made while the sheet is still in a hot forming condition. For effecting the desired heat-sealing, the outer edges of the corrugated sheet may be passed near or through a hot flame or other heating element, and the side of the flat sheet to be bonded therewith may also be heated at least sufficiently to make it tacky so that it will bond readily to the corrugated surface when contacted therewith under slight pressure. Laminated slabs of great strength can be made by bonding together two or more of the resulting corrugated slabs, especially with the corrugation "grain" at right angles to each other.

One method which has been found satisfactory for testing the strength and stability of paving constructions made according to the present invention is to make a Marshall stability test on small cylindrical samples of the thermoplastic polymer-bonded aggregate. The Marshall stability test is described in a pamphlet "The Marshall Method for the Design and Control of Bituminous Paving Mixtures," published by the Marshall Consulting and Testing Laboratory. The test is made by preheating the sand or other aggregate to be used and also preheating the thermoplastic polymer to be used (in place of asphalt), mixing the two materials in the desired proportion, and while still hot tamping this mixture into a cylindrical mold which is about 3″ high and 4″ in diameter. When cooled, the cylinder of polymer-bonded sand is removed from the mold and subjected to a load applied diametrically about the circumference, at a constant rate of 2″ per minute, until failure or until maximum stress has been reached. The amount of deformation (in 1/100 of an inch) at the time of failure or maximum load, is called the Marshall flow. The Marshall stability is expressed in lbs., and is usually made at a temperature of 140° F.

The various polymer-bonded aggregate compositions used in making various types of paving construction according to the present invention, generally have a Marshall stability (at 140° F.) of at least about 2,000 lbs., and preferably about 3,000 to 30,000. The corresponding Marshall flow generally ranges from about 4 to 25, preferably about 7 to 20. The Marshall stability/flow ratio (at 140° F.) is generally about 250–3,000, preferably about 300–2,000. In contrast, most asphalt compositions generally have a Marshall stability/flow ratio (at 140° F.) substantially below 250, and usually between about 100 and 200. Asphalt paving compositions generally have a Marshall stability ranging from about 500 to 1500 or in some cases about 2,000.

In paving constructions, it is highly desirable that a pavement have a certain amount of flexibility as is the case with asphalt paving and with the polymer-bonded aggregate compositions used in the present invention, but it is also highly desirable that a pavement which has sufficient stability when hot (as in the sunshine at noon in summer) should not become too brittle during the cold weather of winter. Vice versa, it is desirable that a pavement which has good toughness characteristics when cold should not become excessively soft when hot. One method of ascertaining a merit rating of a pavement over the temperature range from cold to hot, is to determine the cold/hot Marshall stability ratio (as 75° F./140° F.). For asphalt paving compositions, this stability ratio is in the vicinity of 15, one test showing 16.3 in the case of an asphalt having an 85–100 penetration at 77° F. On the other hand, the polymer-bonded aggregate compositions used according to the present invention generally have a corresponding cold/hot Marshall stability ratio (75° F./140° F.) of below 12, preferably about 1 to 10, and often as excellent as 1 to 5. Thus, the compositions used in the present invention can be designed for the desired strength and stability at the intermediate or average temperature, and then will be found to increase very little in brittleness at lower temperatures, but likewise will increase very little in softness at higher temperatures.

As a further indication of the great difference in superiority of the present paving compositions compared to corresponding asphalt compositions, the 140° F. Marshall stability divided by the softening point (° F.) gives a numerical value of at least 10, preferably 15 to 50 for the compositions of the present invention, compared to the range of about 2 to 5 in the case of asphalt compositions.

As further illustrations of the present invention, the following examples of paving construction are given:

EXAMPLES 1–3

A polyethylene having an average mol. wt. of about 1,500 was mixed with a sand having a grading from ¼″ down to 100 mesh, using about 8% by wt. of polymer, each being preheated to about 350° F., then thoroughly mixed and while still hot, tamped into a cylindrical mold suitable for making samples for a Marshall stability test. The mold is about 3″ high and about 4″ in diameter. When the hot polymer-bonded sand is tamped into place in the mold, cooled and removed from the mold, the resulting cylinder of polyethylene-bonded sand is an exceedingly strong, stable article, showing a Marshall stability test (at 140° F.) of about 2,700 lbs. and it shows a Marshall flow of about 4.5 (hundredths of an inch). Such cylindrical articles are, per se, excellent electrical insulators, and also excellent water-resistant and chemical-resistant supports for motors, generators, or other industrial and household equipment, to keep them off a damp floor.

The 140° F. stability/flow ratio of the composition of Example 1 was 600, which is far superior to the ordinary range of about 10 to 200 for corresponding asphalt compositions. As the polyethylene used here (1,500 mol. wt.) had a softening point of about 120° F., the 140° F. stability divided by softening point (° F.) was 22.5, which is far higher (better) than the ordinary range of about 2 to 5 for corresponding asphalt compositions.

The polyethylene used in this example had a hot melt viscosity (cps.) of 84 at 300° F.; 37 at 400° F. and 16 at 500° F., and accordingly had a cold/hot viscosity ratio (300° F./500° F.) of only 5.3, which is excellently low compared to the correspondingly and undesirably high value of 60 for an asphalt of 85–100 penetration at 77° F. This means that whereas asphalt compositions tend to get undesirably soft when heated to high temperatures (as in sunshine at noon in summer) the polyethylene-bonded sand composition of Example 1 would retain more of its strength when hot. The polyethylene used in Example 1 has a much lower viscosity than the asphalt at 300° F., but has a four times higher viscosity than the asphalt at 500° F., and thus shows far less softening when heated.

Example 1 was repeated with two other polyethylenes of 5,000 and 10,000 average mol. wt. respectively. The corresponding data on the softening point of the various polymers, their viscosity at different temperatures, and the Marshall stability test values and other calculated values are shown for all three polyethylene-bonded sand compositions in the following Table I, including for comparison corresponding data on a composition containing an 85–100 penetration asphalt.

Table I

| Binder | Asphalt, 85-100 penetr. at 77° F. | Polyethylenes | | |
|---|---|---|---|---|
| Type | | AC-617 | AC-615 | DYLT |
| Mol. Wt. | | 1,500 | 5,000 | 10,000 |
| Softening Pt. (° F.) | 115 | 120 | 200 | 215 |
| Melt Viscosity (cps.): | | | | |
| at 300° F. | 240 | 84 | 3,250 | 47,000 |
| at 400° F. | 31 | 37 | 860 | 23,000 |
| at 500° F. | (4) | 16 | 230 | 11,000 |
| Cold/hot viscosity ratio (300° F./500°F.) | 60 | 5.3 | 14.1 | 4 |
| Mixt.—Binder plus Aggreg.: | | | | |
| Mixing temp. (° F.) | 250-350 | 250-350 | 350-450 | 400-500 |
| Marshall, stability lbs. (at 140° F.) | 350 | 2,700 | 6,850 | 9,700 |
| Marshall flow (.01 inch) | 25 | 4.5 | 5.0 | 6.5 |
| 140° F. stability/flow | 14 | 600 | 1,370 | 1,490 |
| 140° F. stability: soft. pt. of binder (° F.) | 3.0 | 22.5 | 34.2 | 45.0 |

The above table shows that all three of the polyethenes per se showed a much superior cold/hot viscosity ratio (300° F./500° F.), ranging from 4.3 to 14.1, compared to the undesirably high value of 60 for the asphalt. Likewise, the data show that all three of the polyethylene-sand compositions showed far higher Marshall stability values, ranging from 2,700 to 9,700 lbs., compared to the undesirably low value of 350 lbs. for the corresponding composition containing the 85-100 penetration asphalt. Similarly, the 140° F. stability/flow ratios of the polyethylene-sand compositions range from 600 to 1,490 compared to only 14 for the asphalt composition. The 140° F. stability divided by the softening point (° F.) range from 22.5 to 45.0 the polyethylene-sand compositions compared to the low value of 3.0 for the asphalt composition.

Thus it is apparent that polyethylenes over the full range of 1,500 to 10,000 mol. wt. are admirably suited for use in small amounts of only 2-8% as binder or bonding agent for sand, or other fine or coarse aggregate or filler, for making various articles of commercial use. Thus the data show excellent properties for use in paving construction, as claimed in the copending application S.N. 831,100, filed concurrently herewith.

EXAMPLE 4

The polyethylene-bonded sand composition of Example 2 was hot molded in the form of a floor tile about 9" square and ¼" thick, and when cooled was found to have excellent properties of strength and stability, and resistance to undesirable indentation, even over fairly widespread in temperature ranges (of from about 0° F. to 140° F.) and under loads ranging from about 3,000 to 30,000 lbs. on Marshall stability blocks.

EXAMPLE 5

A building block of the size and shape of the conventional concrete block (8" x 16" x 8" in height) was made from a polyethylene-bonded sand composition of Example 3, the hot thermoplastic mixture being tamped into the mold, then cooled and withdrawn from the mold.

EXAMPLE 6

The polyethylene-bonded sand composition of Example 2 was applied in the hot thermoplastic condition to the surface of an asphalt road in a layer rolled to a thickness of about ½", and, when cooled, was found excellent as a paving surface, in having good flexibility, yet with great resistance to cracking or indentation by heavy traffic loads. It also was oil-resistant (as to spillage of gasoline, kerosene, etc.), and had per se a lighter color than corresponding asphalt paving and had the advantage of being susceptible to tremendous lightening in color by the addition of only a small amount, e.g. one or two percent of a white titanium dioxide pigment.

EXAMPLE 7

A pipe having an outside diameter of about 3" and an inside diameter of about 2" and a length of about 6', was made experimentally by tamping some of the hot thermoplastic composition of Example 2 in the space between two concentrically positioned pipes, permitted to cool and then removed from the assembly. Such pipe showed excellent impermeability to water, crude oil, and other liquids. Commercially, such pipe of various diameters ranging from about ½ to 36" can be made by hot extrusion methods. For greater impermeability as for transporting gas or liquids, the interior surface of the pipe can be coated with a continuous film of any suitable plastic, such as by filling the pipe temporarily with hot liquid polyethylene, polyvinyl chloride, or other suitable plastic, then withdrawing the liquid and letting the interior coated surface cool.

Numerous other advantages and uses of the compositions of this invention will occur to those skilled in the art from a reading of the foregoing specification.

It is not intended that this invention be limited to the specific examples which have been given merely for the sake of illustration, but only by the appended claims in which it is intended to claim all novelty inherent in the invention and all modifications coming within the scope and spirit of the invention.

What is claimed is:

1. A paving composition comprising a mineral aggregate the major portion of the particles of which are a size of 100 mesh and coarser, bonded with between about 1 and about 10% by weight of a thermoplastic linear type polymer having an average molecular weight of at least 1,000, a softening point measured by the ring-and-ball method of between about 110° F. and about 320° F., a melt viscosity of between about 100 and about 30,000 centipoises at a hot mixing temperature of between about 200 and about 500° F. and having a cold to hot viscosity ratio measured at 300° F. and at 500° F. below 40 to 1, said compositions having a Marshall stability measured at 140° F. of at least 2000 pounds.

2. A paving composition as in claim 1 in which the linear type polymer is polyethylene.

3. A paving composition as in claim 1 in which the linear type poymer is polypropylene.

4. A paving composition as in claim 1 in which the linear type polymer is polyvinylchloride.

5. A paving composition as in claim 1 in which the linear type polymer is a polyethylene having a melt viscosity of between about 100 and about 2000 centipoises measured at a hot mixing temperature of between about 200° F. and about 500° F.

6. A paving composition as in claim 1 in which the linear type polymer is a polypropylene having an average molecular weight between about 2,000 and about 100,000.

7. A thermoplastic paving composition capable of being shaped when hot, comprising a polymer bonded mineral aggregate in which the major portion of the solid particles of the mineral aggregate are of a size ranging from about ¼ inch up to and including about 100 mesh and a minor portion of the solid particles of the mineral aggregate are of a size smaller than about 100 mesh, bonded with between about 1 and about 10% by weight of a thermoplastic linear type polymer having an average molecular weight of at least 1,000 and being substantially free of crosslinking, a softening point measured by the ring-and-ball method of between about 120 and about 330° F., a melt viscosity of between about 150 and about 20,000 centipoises at a hot mixing temperature between about 250 and about 500° F. and having a cold to hot viscosity ratio measured at 300° F. and measured at 500° F. of between about 3 to 1 and about 20 to 1, the said composition having a Marshall stability measured at 140° F. of at least 2,000 lbs., and having a ratio of stability to flow measured at 140° F. of between about 250 to 1 and about 3,000 to 1.

8. A paving composition as in claim 7 in which the linear type polymer is polyethylene.

9. A paving composition as in claim 7 in which the linear type polymer is polypropylene.

10. A paving composition as in claim 7 in which the linear type polymer is polyvinyl chloride.

11. A paving composition as in claim 7 in which the linear type polymer is a polyethylene having a melt viscosity of between about 100 and about 20,000 centipoises measured at a hot mixing temperature of between about 200° F. and about 500° F.

12. A paving composition as in claim 7 in which the linear type polymer is a polypropylene having an average molecular weight between about 2,000 and about 100,000.

13. A paving composition as in claim 7 in which the linear type polymer is substantially colorless and the composition contains between about 0.1 and about 5.0 wt. percent of a coloring pigment.

14. A paving composition comprising between about 92 and about 98 weight percent of mineral aggregate in which the major portion of the particles are of a size of 100 mesh and coarser, and are bonded with between about 2 and about 8% by weight of linear-type polyethylene having an average molecular weight of between about 1,000 and about 10,000, said composition having a Marshall stability measured at 140° F. of at least 2,000 lbs.

15. A process of preparing a paving composition which comprises preheating to a hot fluid mixing temperature of between about 250 and about 400° F., between about 1 and about 10 weight percent of a thermoplastic linear type polymer having an average molecular weight of at least 1,000, a softening point measured by the ring-and-ball method of between about 110° F. and about 230° F., a melt viscosity of between about 100 and about 30,000 centipoises, measured at a hot mixing temperature of between about 200 and about 500° F. and having a cold to hot viscosity ratio measured at 300° F. and measured at 500° F. of below 40 to 1, preheating to a temperature between about 250 and about 400° F., between about 90 and about 99% by weight of solid mineral aggregate in which the major portion of the solid particles of the mineral aggregate are of a size ranging from about ¼ inch up to and including about 100 mesh and a minor portion of the solid particles of the mineral aggregate are of a size smaller than about 100 mesh, said particles being infusible at temperatures of between about 200 and about 500° F., hot mixing said preheated linear type polymer and said preheated solid mineral aggregate particles to coat the mineral particles with said polymer and to produce a thermoplastic mixture which, when compacted and cooled, has a Marshall stability measured at 140° F., of at least 2,000 lbs.

16. A process of preparing a paving composition which comprises admixing with a linear type polymer, having a softening point and a hot melt viscosity higher than that adapted for thermoplastic hot fluid mixing at temperatures between about 200° F. and about 500° F., a plasticizing amount of a material having a softening point and a hot melt viscosity low enough to permit its use for thermoplastic mixing at temperature between about 200 and about 500° F., and low enough upon blending with a thermoplastic linear type polymer, to produce a polymer blend having a softening point measured by the ring-and-ball method between about 110° F. and about 230° F., a melt viscosity between about 100 and about 30,000 centipoises at hot mixing temperatures between about 200 and about 500° F. and a cold to hot viscosity ratio measured at 300° F. and measured at 500° F. below 40 to 1, preheating mineral aggregate in which the major portion of the solid particles of the aggregate are of a size ranging from about ¼ inch up to and including about 100 mesh and a minor portion of the solid particles of the aggregate are of a size smaller than about 100 mesh, admixing said preheated mineral aggregate particles and said thermoplastic polymer blend at temperatures between about 200 and about 500° F. in amounts of between about 1 and about 10% of polymer blend and between about 90 and about 99% of mineral aggregate to produce a thermoplastic admixture, which when compacted and cooled has a Marshall stability measured at 140° F. of at least 2,000 lbs. and a stability to flow ratio, measured at 140° F., of between about 250 to 1 and about 3,000 to 1.

References Cited in the file of this patent

UNITED STATES PATENTS

| | | |
|---|---|---|
| 2,279,762 | Scott et al. | Apr. 14, 1942 |
| 2,347,233 | Abernathy | Apr. 25, 1944 |
| 2,773,851 | Tolman | Dec. 11, 1956 |
| 2,823,194 | McKay et al. | Feb. 11, 1958 |
| 2,861,895 | Hardman | Nov. 25, 1958 |
| 2,925,831 | Welty et al. | Feb. 23, 1960 |
| 2,993,799 | Blake | July 25, 1961 |

FOREIGN PATENTS

| | | |
|---|---|---|
| 513,453 | Great Britain | Oct. 12, 1939 |
| 167,201 | Australia | Mar. 8, 1956 |